(12) United States Patent
Colcombet

(10) Patent No.: US 10,151,418 B2
(45) Date of Patent: Dec. 11, 2018

(54) SHEATH FOR PROTECTING AGAINST FIRE

(71) Applicant: TECALEMIT AEROSPACE, Chaponost (FR)

(72) Inventor: Thierry Colcombet, Saint Cyr au Mont d'or (FR)

(73) Assignee: TECALEMIT AEROSPACE, Chaponost (FR)

( * ) Notice: Subject to any disclaimer, the term of this patent is extended or adjusted under 35 U.S.C. 154(b) by 183 days.

(21) Appl. No.: 14/439,573

(22) PCT Filed: Oct. 29, 2013

(86) PCT No.: PCT/FR2013/052592
§ 371 (c)(1),
(2) Date: Apr. 29, 2015

(87) PCT Pub. No.: WO2014/068249
PCT Pub. Date: May 8, 2014

(65) Prior Publication Data
US 2015/0260328 A1    Sep. 17, 2015

(30) Foreign Application Priority Data
Oct. 29, 2012  (FR) ...................... 12 60309

(51) Int. Cl.
*F16L 57/04* (2006.01)
*B32B 1/08* (2006.01)
(Continued)

(52) U.S. Cl.
CPC ................ *F16L 57/04* (2013.01); *B32B 1/08* (2013.01); *B32B 27/12* (2013.01); *B32B 27/322* (2013.01);
(Continued)

(58) Field of Classification Search
None
See application file for complete search history.

(56) References Cited

U.S. PATENT DOCUMENTS 3,913,625 A * 10/1975 Gazda .................. B29C 47/021
138/127
4,137,949 A *  2/1979 Linko, III ............... F16L 9/147
138/125

(Continued)

FOREIGN PATENT DOCUMENTS

| WO | 9967561 A1 | 12/1999 |
| WO | 2009048470 A1 | 4/2009 |
| WO | 2011120525 A1 | 10/2011 |

OTHER PUBLICATIONS

International Search Report dated Feb. 26, 2014 re: Application No. PCT/FR2013/052592.

(Continued)

*Primary Examiner* — Craig Schneider
*Assistant Examiner* — David Deal
(74) *Attorney, Agent, or Firm* — Cantor Colburn LLP

(57) ABSTRACT

The invention relates to a protective sheath (50) for covering a fluid-transporting pipeline, comprising a flame-proof, non-inflammable layer (52) and a heat insulation layer (54) arranged beneath the non-inflammable layer, the non-inflammable layer consisting only of carbon and the heat insulation layer comprising a knitted fabric, the knitted fabric comprising a plurality of stitches and air trapped within the plurality of stitches such that the heat insulation layer comprises at least 70 vol. % of air. Furthermore, the non-inflammable layer comprises carbon fibers providing 100% coverage in order to protect the heat insulation layer from contact with flames.

13 Claims, 2 Drawing Sheets

(51) Int. Cl.
  *F16L 11/08*  (2006.01)
  *F16L 11/12*  (2006.01)
  *B32B 27/12*  (2006.01)
  *B32B 27/32*  (2006.01)
  *D04B 1/22*  (2006.01)
  *D04C 1/12*  (2006.01)
  *B64D 37/20*  (2006.01)
  *B64D 37/32*  (2006.01)

(52) U.S. Cl.
  CPC ............... *D04B 1/225* (2013.01); *D04C 1/12* (2013.01); *F16L 11/082* (2013.01); *F16L 11/086* (2013.01); *F16L 11/125* (2013.01); *B32B 2262/106* (2013.01); *B32B 2307/304* (2013.01); *B32B 2307/3065* (2013.01); *B32B 2307/54* (2013.01); *B32B 2307/718* (2013.01); *B32B 2597/00* (2013.01); *B32B 2605/18* (2013.01); *B64D 37/20* (2013.01); *B64D 37/32* (2013.01)

(56) References Cited

U.S. PATENT DOCUMENTS

| | | | | |
|---|---|---|---|---|
| 4,675,221 A | * | 6/1987 | Lalikos | B25B 27/10 138/103 |
| 5,679,425 A | * | 10/1997 | Plumley | B32B 1/08 428/35.7 |
| 7,588,057 B2 | * | 9/2009 | Bentley | F16L 11/088 138/127 |
| 8,955,552 B2 | * | 2/2015 | Nanney | F16L 11/087 138/124 |
| 2002/0090873 A1 | * | 7/2002 | Moody | B32B 5/26 442/268 |
| 2010/0126617 A1 | * | 5/2010 | Stroempl | F16L 11/125 138/137 |
| 2010/0154917 A1 | * | 6/2010 | Batallas | F16L 59/029 138/141 |
| 2011/0290362 A1 | | 12/2011 | Weil et al. | |
| 2012/0266997 A1 | | 10/2012 | Thygesen et al. | |
| 2016/0089851 A1 | * | 3/2016 | Drexler | B32B 27/304 244/119 |
| 2016/0153121 A1 | * | 6/2016 | Higuchi | C08F 20/44 423/447.2 |

OTHER PUBLICATIONS

Written Opinion dated Feb. 26, 2014 re: Application No. PCT/FR2013/052592.

* cited by examiner

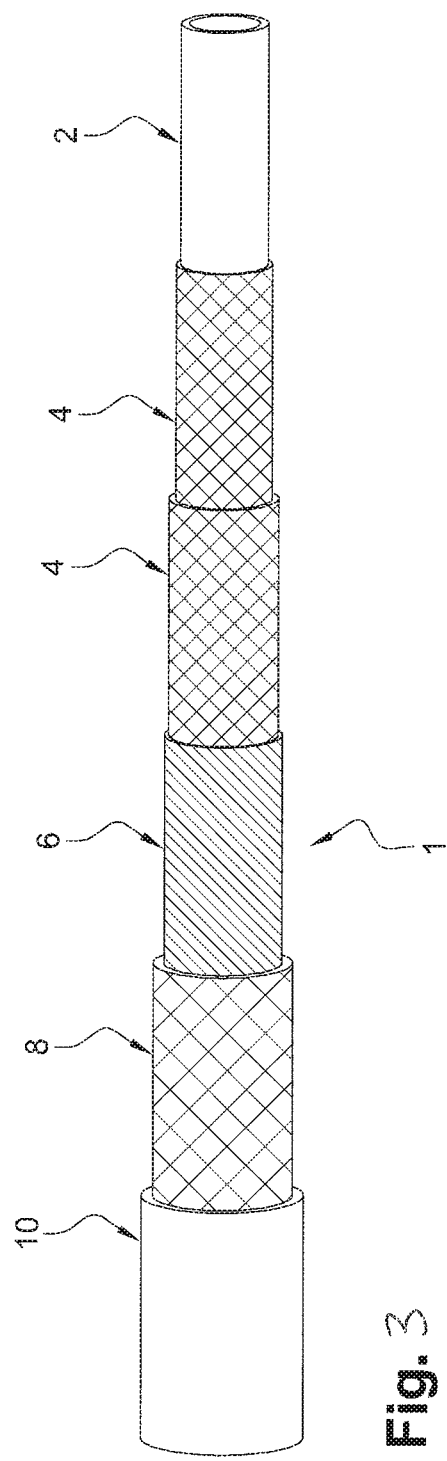

SHEATH FOR PROTECTING AGAINST FIRE

TECHNICAL FIELD

The present invention relates to a sheath for protecting against fire, a method of producing a flexible composite pipe comprising this sheath, and a composite pipe, in particular a flexible composite pipe intended for transporting a fluid in an aircraft, comprising this sheath.

BACKGROUND

The pipes used for applications in the aeronautics field must meet certain requirements such as resistance to fire for predetermined security time periods.

Furthermore, within a global context of reducing fuel consumption, the requirement of reducing the mass of aircrafts is becoming a priority.

It is known of transporting fluids in an aircraft by means of flexible pipes, comprising for example stainless steel braids for pressure resistance within the pipe and a heat protection sheath, of silicone, intended for protecting the pipes during a fire by meeting the requirements.

However, these pipes and conventional protection sheaths have a relatively important mass, due to the silicone used as protective material against fire. This contributes in weighing down aircrafts equipped with it. These conventional pipes and protection sheaths hence offer a limited response to the issue of reducing the mass of aircrafts.

Furthermore, although the silicone provides efficient heat protection against fire, silicone however has a limited response to protection against flames.

In fact, the drawback of silicone is that it becomes friable in contact with a flame, so much so that as a result of vibrations on an aircraft during flight, a silicone protection sheath subjected to a prolonged contact with flames may disintegrate, and thereby expose the layers of an underlying duct of the sheath to the flames.

The security imperatives, in particular of fire protection, and economical and environmental imperatives linked to reduction in fuel consumption and hence a decrease in aircraft mass, thus currently result in a conflict to which conventional pipes often do not fully meet in as far as the response to certain requirements is privileged by comparison to others.

It is further known from patent documents US2011290362, WO9967561, WO201120525 and US2012266997 composite pipes. However, most of these pipes are intended for offshore applications, immersed between an underwater well and a surface station. In any case, none of these pipes relate to the field of fire protection composite pipes.

BRIEF SUMMARY

Within this technical context, the present invention, aims to overcome all or part of these drawbacks by proposing a fire protection sheath which offers a satisfactory solution both for fire resistance and mass reduction requirements.

To this end, the invention provides a protection sheath, intended to cover a fluid transporting pipe, the sheath comprising a flame-proof non-flammable layer and a heat insulation layer arranged beneath the non-flammable layer, the non-flammable layer composed of carbon and the heat insulation layer comprising a knitted fabric, the knitted fabric comprising a plurality of stitches and air trapped within the plurality of stitches, the heat insulation layer comprising at least 70 vol. % of air, and wherein the non-flammable layer comprises carbon fibers providing 100% coverage with a view to protecting the heat insulation layer from contact with flames.

Thus, the sheath according to the invention offers the advantage of combining a light flame-proof non-flammable layer and a light heat insulation layer.

The flame-proof layer protects the heat insulation layer from direct contact with flames, so much so that this heat insulation layer does not become damaged, keeps its physical integrity and its heat insulation properties.

Flame resistance is obtained by the fact that carbon keeps its state of origin, does not disintegrate, in contact with the flames.

Flame resistance is also obtained by the fact that the first layer is constituted only of carbon fiber, to the exclusion of all other material that would become damaged in contact with the flames.

Flame resistance is finally obtained by a total fiber coverage rate of 100% of the carbon fibers, which implies the complete absence of interstices which would let the flames penetrate through the carbon fibers.

A layer having a fiber coverage rate of 100% thus means a layer devoid of spaces between the assemblies of fibers.

Particularly, by non-flammable layer comprising a braid of carbon fibers with a 100% coverage rate is meant a layer devoid of spaces between the assemblies of the braid.

In other words, this means that the layer is opaque and completely conceals the underlying layer.

This makes the layer entirely flame proof. Flames cannot cross it.

Hence, this prevents the ignition of the knitted fabric layer located beneath the non-flammable layer, thus ensuring that the knitted fabric layer maintains its heat shield function for a substantially longer period than if it were subjected to the contact of flames.

This synergy between flame resistance and heat insulation by air bubbles trapped within a knitted fabric thus provides substantially improved resistance to fire.

This improvement is further accompanied with an important reduction of the mass, due to the association of carbon and air for fulfilling the respective functions of flame resistance and thermal barrier.

Furthermore, the construction of the non-flammable and heat insulation layers set up air spaces which contribute to the protection against heat.

Finally, the advantage of carbon is that it is non-flammable, the same cannot be said for silicone.

According to a preferred embodiment, the sheath comprises, over the non-flammable layer, a sealing anti-fire-starter layer intended for preventing, prior to a fire, combustibles from the outside environment from penetrating through the sheath.

Thus, the sheath is protected against a fire-starter effect. The fire-starter effect can occur when combustibles from the outside environment, such as greases or oils, after having been able to penetrate through a sheath and thus become accumulated in internal layers of the sheath, feed the fire and as a result cause a rapid combustion of these internal layers during a fire.

It is worth noting that this sealing anti-fire-starter layer corresponds to a consumable film or varnish. This film or varnish disappears in contact with the fire in order to let the non-flammable layer do its work. However, before the start of a fire, this sealing film or varnish will have prevented the combustibles from the outside environment from penetrating into the knitted fabric layer and causing a fire-starter effect, thus increasing the period during which the sheath can protect a pipe from a fire.

Advantageously, the sealing anti-fire-starter layer comprises a fluoropolymer.

According to a preferred embodiment, the sealing anti-fire-starter layer is made of polytetrafluoroethylene (PTFE).

The advantage of PTFE is that, apart from the sealing property thereof with respect to combustibles which may be from the outside environment of grease or oil type, it slows down the propagation of heat to the underlying layers.

Alternatively, the sealing anti-fire-starter layer may be made of polyvinylidene fluoride (PVDF), or perfluoroalkoxy (PFA), or fluorinated ethylene propylene (FEP).

Preferably, the knitted fabric corresponds to a glass fiber knitted fabric.

This feature offers the advantage of combining a low mass and efficient heat insulation, in keeping with the combination of air and carbon.

The knitted fabric may alternatively correspond to a basalt fiber knitted fabric, to a mica fiber knitted fabric, a metal fiber knitted fabric such as titanium, or even a ceramic fiber knitted fabric.

Advantageously, the non-flammable layer corresponds to a carbon fiber braid.

The braid advantageously offers the possibility of efficiently controlling the volume of air in the underlying heat insulation layer, by avoiding the compression thereof. The braiding of the non-flammable layer thus improves the heat insulation performance of the sheath.

Preferably, the heat insulation layer is constituted of two superimposed knitted fabric layers.

This feature offers the advantage of increasing the quantity of air that is present in the heat insulation layer. This allows increasing the heat insulation provided by the sheath.

According to another aspect, the invention concerns a method of producing a pipe including an upper layer, the method comprising a step of depositing, on the upper layer of the pipe, a protection sheath having the aforementioned features.

This method advantageously allows efficiently protecting a pipe from fire, without weighting it down.

In an advantageous manner, the step of depositing the sheath on the upper layer comprises a step of knitting the heat insulation layer onto the upper layer of the pipe in order to obtain a heat insulation layer of an external diameter such that the heat insulation layer comprises 70% vol. of air, and a step of depositing the non-flammable layer composed only of carbon and of an internal diameter substantially equal to the external diameter of the heat insulation layer.

Thus, the heat insulation layer is not compressed by the non-flammable layer.

This allows capturing maximum air in the knitted fabric, hence improving heat insulation without a significant mass increase.

The step of depositing the non-flammable carbon layer may be carried out by crossing carbon fibers, in particular by braiding, coiling, filament winding, reaming, taping, knitting, flat weaving or circular weaving the carbon fibers.

Preferably, the step of depositing the non-flammable carbon layer corresponds to braiding carbon fibers.

The braid advantageously allows controlling the trapped volume of air, as the braid does not compress this volume of air.

The invention also relates to a pipe comprising a sheath having the aforementioned features.

According to an aspect, the invention also provides a composite pipe intended for transporting a fluid in an aircraft, comprising an internal tubular layer forming a chemical barrier within which a fluid is intended to flow, in particular a lubricating or fuel fluid, the internal tubular layer being covered with at least one reinforcing layer intended to resist to pressure inside the pipe, characterized in that said at least one reinforcing layer is covered with at least one, fire resistance layer made of carbon, intended for protecting the pipe from fire. This pipe may advantageously comprise a protection sheath having the aforementioned features and said carbon layer corresponds to the non-flammable layer.

Thus, the pipe according to the invention allows conciliating between the fire resistance requirements and mass reduction, by using a non-flammable, very light and highly fire resistant carbon layer.

By resistance to fire, or fire stability, is meant (apart from a possible heat insulation function) the conservation of mechanical properties.

When applied to the pipe, the resistance to fire allows keeping the functions of this pipe, particularly the function of transporting a fluid or fluids.

The resistance to fire terminology expresses the capacity of the products to satisfy the "fire resistance" grades (grade designating components, equipment and structures capable of withstanding the application of heat caused by a standard flame for five minutes) and "fireproof" (grade designating components, equipment and structures capable of withstanding the application of heat caused by a standard flame for fifteen minutes) according to the terms of the ISO 2685 standard.

The advantage of the carbon layer is that it keeps the structural entirety of the pipe in the event of fire. It ensures a durable firebreak function. The resistance of carbon to fire constitutes an advantage with respect to conventional pipe sheaths, in particular silicone ones, which, during a fire, may crackle as a result of the vibrations and crumble, thereby exposing the lower layers to the fire.

With an equivalent mass, the pipe according to the invention provides a better resistance to fire than that of a conventional pipe. With an equivalent resistance to fire, the pipe according to the invention provides the advantage of a lower mass than that of a conventional pipe.

According to an embodiment, said at least one carbon layer is produced by crossing carbon fibers, in particular by braiding, coiling, filament winding, reaming, taping, knitting, flat weaving or circular weaving the carbon fibers.

According to a form of execution, said at least one reinforcing layer intended to resist to pressure inside the pipe is made of an aramid material.

That has the advantage of lightness, while ensuring a good mechanical hold of the composite pipe and a good bursting resistance.

It could be considered to produce the reinforcing layer or layers in a metallic material, such as titanium fibers or stainless steel.

In an advantageous manner, said at least one reinforcing layer is produced by crossing aramid fibers, in particular by braiding, coiling, filament winding, reaming, taping, knitting, flat weaving or circular weaving the aramid fibers.

According to a possibility, said at least one reinforcing layer comprising aramid material is in Kevlar®.

In an advantageous manner, the pipe comprises two superimposed reinforcing layers.

According to an embodiment, the pipe comprises at least one layer made of thermally insulated refractory material, interposed between said at least one reinforcing layer and said at least one carbon layer.

The layer or layers made of refractory material allow increasing further still the resistance to fire of the pipe, by decreasing the transmission of heat to the subordinate layers.

The layer made of refractory material may correspond to the heat insulation layer of the sheath according to the invention.

According to a form of execution, said at least one layer made of refractory material comprises a material selected from among glass fiber, basalt, silicone or mica.

Said at least one layer made of refractory material may be formed from either glass fiber only, basalt only, silicone only or mica only.

Said at least one layer made of refractory material may be composite, for example formed by associating carbon with one of the materials selected from among glass fiber, basalt, silicone, or mica (that is to say at least carbon and glass fiber, or at least carbon and basalt, or at least carbon and silicone, or at least carbon and mica).

According to a possible embodiment, the pipe comprises an external layer forming a sealing barrier, covering said at least one carbon layer.

The external layer may correspond to the sealing anti-fire-starter layer of the sheath according to the invention.

The external layer forming a sealing barrier may also form a mechanical barrier for protecting the underlying carbon layer or layers.

In an advantageous manner, the external layer forming a sealing barrier is obtained by extrusion, molding, sintering, injecting, forming or coating.

Coating usually means any method comprising applying a fluid material in a continuous manner in order to cover a support surface. That in particular includes producing a varnish.

According to an embodiment, the external layer forming a sealing barrier comprises a fluoropolymer.

Advantageously, the external layer forming a sealing barrier comprises a fluoropolymer selected for example from among polytetrafluoroethylene (PTFE), polyvinylidene fluoride (PVDF) or perfluoroalkoxy (PFA).

The external layer forming sealing barrier may comprise fluorinated ethylene propylene (FEP).

According to a possibility, the internal tubular layer forming chemical barrier is made of polytetrafluoroethylene (PTFE). This internal tubular layer may also comprise carbon.

The internal tubular layer forming chemical barrier may be convolute or smooth, single layer or double layer.

The invention also relates to an aircraft, in particular an airplane, comprising a pipe having the aforementioned features.

The invention also relates to using a fire resistant casing, for protecting an object contained in the casing from the fire, said casing obtained by crossing carbon fibers, in particular by braiding, coiling, filament winding, reaming, taping, knitting, flat weaving or circular weaving the carbon fibers.

The object may in particular correspond to a pipe, a cable, a mechanical longitudinal part, such as a revolution part.

BRIEF DESCRIPTION OF THE DRAWINGS

Other features and advantages of the present invention will become apparent from the following description of an embodiment, given by way of non limiting example, with reference to the accompanying drawings in which:

FIG. 3 is a side view showing the successive layers of a pipe according to an embodiment of the invention.

DETAILED DESCRIPTION

Figure 1:
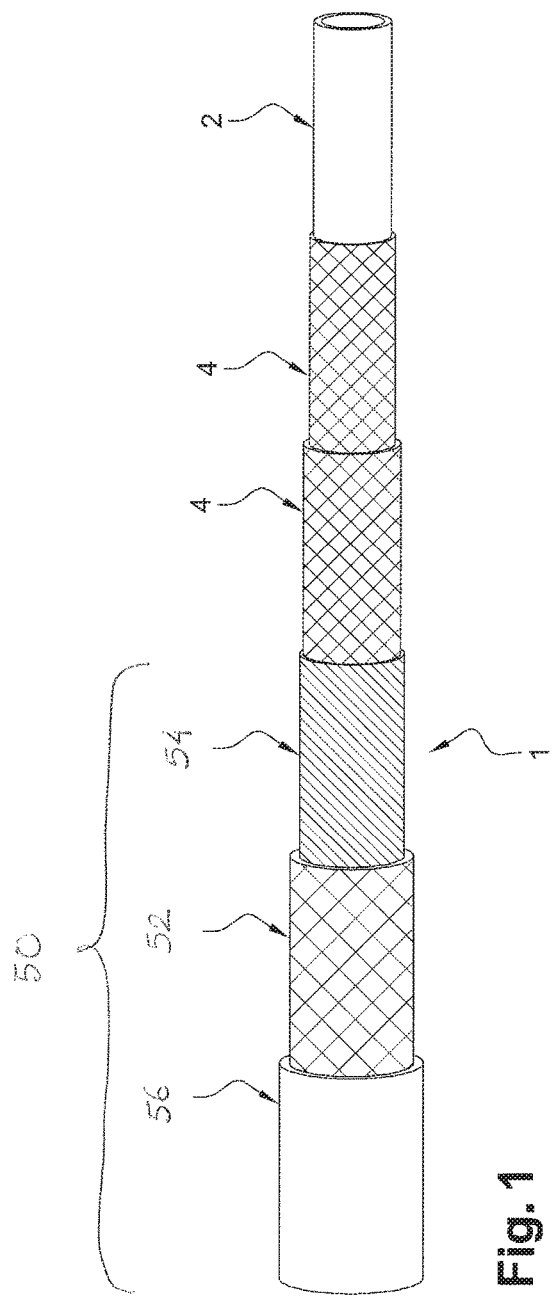
FIG. 1 is a side view showing the successive layers of a sheath equipping a pipe, according to an embodiment of the invention.

FIG. 1 shows a composite pipe 1 equipped with a protection sheath 50 according to an embodiment of the invention. This pipe 1 may more particularly correspond to a flexible composite pipe, intended for transporting fluid, such as lubricating or fuel fluid, in an aircraft, in particular for an aircraft engine.

The sheath 50 comprises a non-flammable layer 52.

The non-flammable layer 52 is flame-proof. The non-flammable layer 52 is composed of carbon only.

The sheath 50 also comprises a heat insulation layer 54, arranged beneath the non-flammable layer 52.

The heat insulation layer 54 corresponds to a knitted fabric.

The knitted fabric comprises a plurality of stitches and air trapped in the plurality of stitches, in such a manner that the heat insulation layer 54 comprises at least by volume 70% of air.

The volume of air in the knitted fabric is measured by calculating the section of the knitted fabric layer on the basis of the difference between the external diameter and the internal diameter, then by weighing the knitted fabric, then, knowing the mass density proper to the material in which the knitted fabric layer is made, by calculating the apparent density, thus allowing to deduce the volume of air.

According to the invention, the non-flammable layer 52 comprises carbon fibers providing a 100% coverage rate for integrally protecting the heat insulation layer 54 from direct contact with the flames. Thus, the flames cannot cross the non-flammable layer 52.

The air-carbon combination and coverage rate of 100%-70% volume of air according to the invention allows producing a light dual-function dual-layer flame proof-heat insulation sheath providing a substantially improved protection against fire.

Preferably, the heat insulation layer 54 corresponds to a glass fiber knitted fabric which offers the advantage of lightness and contributes to heat insulation. It may alternatively correspond to a basalt fiber knitted fabric, to a mica fiber knitted fabric, a metal fiber knitted fabric such as titanium, or even a ceramic fiber knitted fabric.

The heat insulation layer 54 may be constituted of two superimposed knitted fabric layers.

The non-flammable layer 52 may advantageously comprise a carbon fiber braid.

As it can be seen on FIG. 1, the sheath 50 advantageously comprises, over the non-flammable layer 52, a sealing anti-fire-starter layer 56.

The sealing anti-fire-starter layer 56 is intended to prevent, prior to a fire, combustibles from the outside environment from penetrating through the sheath 50.

This sealing anti-fire-starter layer 56 is in fact sealing with respect to combustibles from the outside environment, such as greases or oils.

It is worth noting that the sealing anti-fire-starter layer 56 may advantageously comprise a fluoropolymer. Preferably, the sealing anti-fire-starter layer 56 comprises of polytetrafluoroethylene (PTFE). It can also be composed of polyvinylidene fluoride (PVDF), or perfluoroalkoxy (PFA), or fluorinated ethylene propylene (FEP).

The greater the thickness of the non-flammable layer 52 and the heat insulation layer 54, the longer the sheath 50 is resistant to a fire. However, according to a possibility, the thickness of the non-flammable layer 52 may be of the order of 1 mm and the thickness of the heat insulation layer 54 may be of the order of 1 mm, thus allowing to lighten the sheath 50 without causing prejudice to the barrier performance with regard to flames and heat insulation.

By way of example, the numbering of the fiber forming the knitted fabric is in the range of 60 to 80 decitex, and the numbering of the carbon fiber forming the non-flammable layer is in the range of 1200 tex.

The method of producing the pipe 1 is described hereinafter. It comprises a step of depositing the protection sheath 50 on an upper layer 4 of the pipe 1, this layer 4 able to correspond to a reinforcing layer for example of aramid material.

The step of depositing the sheath 50 on the upper layer 4 comprises a step of knitting the heat insulation layer 54 onto the upper layer 4 of the pipe 1 in order to obtain a heat insulation layer 54 with an external diameter such that the heat insulation layer 54 comprises 70 vol. % of air, and a step of depositing the non-flammable layer 52 constituted only of carbon and having an internal diameter substantially equal to the external diameter of the heat insulation layer 54, so as not to compress the air contained in the knitted fabric.

The step of depositing the non-flammable carbon layer 52 is advantageously carried out by crossing carbon fibers, in particular by braiding, coiling, filament winding, reaming, taping, knitting, flat weaving or circular weaving the carbon fibers.

The flexible composite pipe 1 of FIG. 3 here comprises an internal tubular layer 2 forming chemical barrier, one or several reinforcing layers 4, for example in braids of aramid material, covering the internal tubular, layer 2, possibly one or several layers 6 made of refractory material covering the reinforcing layer or layers 4, at least one fire resistant layer 8 made of carbon, optionally covering the layer or layers 6 made of refractory material or the reinforcing layer or layers 4, and for example an external layer 10 forming sealing barrier covering the fire resistant layer or layers 8 made of carbon.

The internal tubular layer 2 forming chemical barrier is intended for the flow of a fluid, such as a lubricating or fuel fluid. This internal tubular layer 2 may correspond to a fluorinated, single or dual layer, flexible convolute or smooth duct, or to any suitable duct having the chemical barriers and compatibilities required for the flow of a lubricating or fuel fluid. By way of example, the internal tubular layer 2 may be made of polytetrafluoroethylene (PTFE). It may comprise carbon serving for electrical conductivity, in order to resolve the issues of static electricity.

The reinforcing layer or layers 4, by the number of two according to the example of FIG. 3, ensure the mechanical hold and structure of the pipe 1. These reinforcing layers 4, here in braids of aramid material, are suitable for resisting to pressure in the pipe 1. They may comprise for example of Kevlar®. They can be produced by any yarn crossing technique, in particular by braiding, coiling, filament winding, reaming, taping, knitting, flat weaving or circular weaving of aramid fibers.

Still according to the example of FIG. 3, the pipe 1 here comprises one single layer 6 made of refractory material, resistant to high temperatures, for protecting the pipe 1 from fire. The layer 6 for example is made of glass fiber. It may comprise basalt, mica or silicone. The layer 6 may also be composed of glass fiber and basalt, glass fiber and mica, or glass fiber and silicone.

The layer 8 is intended to ensure the fire resistance of the pipe 1. This layer 8 is made of carbon. Thus, it allows keeping the structural entirety of the pipe in the event of fire. It may be produced by any yarn crossing technique, in particular by braiding, coiling, filament winding, reaming, taping, knitting, flat weaving or circular weaving the carbon fibers.

It may comprise carbon fibers of all moduli, in particular of high modulus, standard modulus or intermediate modulus.

The layer 10 forming sealing barrier is added to the surface of the underlying, carbon, fire stability layer (or layers) 8. This layer 10 is intended to seal the pipe 1. The layer 10 may be obtained by any polymerization method of liquid and hydrocarbon resistant material. The layer 10 may be obtained by extrusion, molding, coating, injecting, forming or sintering. By way of example, it can be constituted by PTFE, PVDF or PFA fluorines.

The layer 10 forming sealing barrier may comprise fluorinated ethylene propylene (FEP).

The aforementioned sheath 50 may form an integral part of the pipe 1. Optionally, the layer 6 may correspond to the heat insulation layer 54, the carbon layer 8 may correspond to the non-flammable layer 52, and the external layer 10 may correspond to the sealing anti-fire-starter layer 56. Optionally, the layer 6, the layer 8 and the layer 10 comprise all or part of the aforementioned features respectively of the heat insulation layer 54, the non-flammable layer 52 and the sealing anti-fire-starter layer 56.

The pipe 1 is intended for use in the aeronautics field. In this respect, the invention also relates to an aircraft, such as an airplane, comprising the pipe 1.

The pipe 1 fully meets the expectations, and goes beyond the requirements of the ISO 2685 aeronautics standard.

Tests were conducted. These tests comprised applying the standard flame defined by the ISO 2685 standard to test the fire resistance.

Thus, during the exposure to the standard flame according to the ISO 2685 standard, samples are exposed to the following constraints: circulation of a hydraulic fluid having a fluid temperature over 93° C., a fluid pressure of 10 bars and a fluid output of 4 L/min, and exposed to a vibration of 33 Hz with a 1.6 mm amplitude. The samples are exposed to the standard flame until the test specimen ruptures. The duration of tests has been set to 30 minutes maximum, corresponding to twice the maximum duration set by the ISO 2685 standard, for this demonstration.

Figure 2:
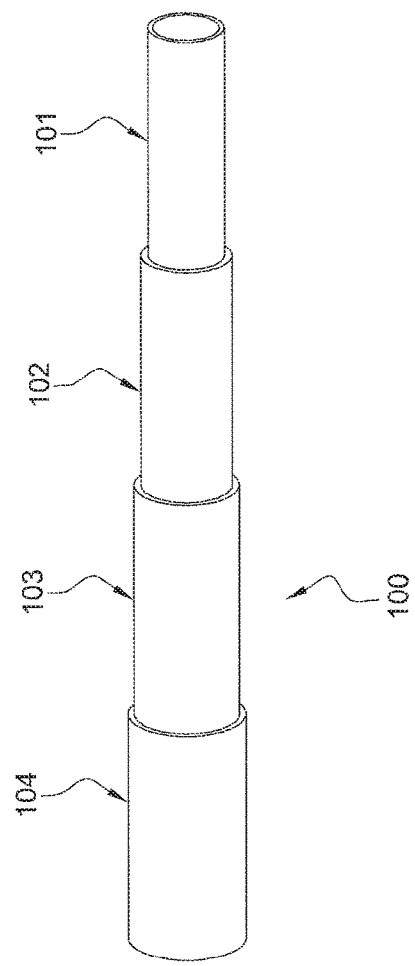
FIG. 2 is a side view showing different layers of a pipe, with the aim of illustrating comparative tests.

In reference to FIG. 2, the samples submitted for testing are flexible ducts 100 having the following configurations:

| Reference | Composition |
|---|---|
| Configuration 1 | 101 = PTFE |
| | 102 = Aramid |
| | 103 = Glass |
| Configuration 2 | 101 = PTFE |
| | 102 = Aramid |
| | 104 = Carbon |
| Configuration 3 | 101 = PTFE |
| | 102 = Aramid |
| | 103 = Glass |
| | 104 = Carbon |

Layers 101 and 102 are identical in dimensions and features in the three configuration cases. The layer 104 is lower in weight than layer 103. Layers 103 of configuration 1 and configuration 3 are the same in dimensions and features.

The following results are obtained:

| Test conditions | Requirements | Sample reference and comparative results | | |
|---|---|---|---|---|
| | | Configuration 1 | Configuration 2 | Configuration 3 |
| Sample length | >600 mm | >600 mm | >600 mm | >600 mm |
| Oil temperature inlet | >93° C. | >93° C. | >93° C. | >93° C. |
| Flame temperature | >1020° C. | >1020° C. | >1020° C. | >1020° C. |
| Density of heat flow rate of the burner | >106 kW/m$^2$ | >106 kW/m$^2$ | >106 kW/m$^2$ | >106 kW/m$^2$ |
| Output | 4 l/min | 4 l/min | 4 l/min | 4 l/min |
| Pressure | 10 bars | 10 bars | 10 bars | 10 bars |
| Distance between the surface of the burner and the surface of the sample | 75 mm ± 10% | 75 mm | 75 mm | 75 mm |
| Test duration | 30 minutes | Rupture at 8 min. 25 s | Rupture at 19 min. 6 s | 30 min. (test stopped without rupture) |

These tests show that, with an identical diameter, a pipe (configuration 1) comprising an internal PTFE layer 101, a layer 102 made of aramid material covered by a glass fiber braid layer 103 resists for 8 minutes to the fire, whereas when the glass fiber layer 103 is replaced by a lighter carbon layer 104, the pipe (configuration 2) resists at least for nineteen minutes to the fire. Furthermore, when in addition to a glass fiber layer 103, a carbon layer 104 (configuration 3) is added, the pipe resists for more than thirty minutes (test stopped after thirty minutes).

It is to be understood that the obtained results in terms of resistance to fire using a carbon layer go beyond the anticipated results.

These results are all the more interesting since the use of a carbon layer simultaneously allows attaining a reduction of the pipe mass between 30% to 50%, in particular with respect to conventional flexible pipes comprising stainless steel and silicone layers, for identical internal tube dimensions and identical use performance requirements.

This gain in mass is significant in an airplane equipped with pipes 1 according to the invention, considering the important number of pipes that can equip such an airplane.

The use of a fire resistant casing obtained by crossing carbon fibers, in particular by braiding, coiling, filament winding, reaming, taping, knitting, flat weaving or circular weaving the carbon fibers, allows protecting an object contained in the casing from the fire, in particular a duct, a cable, a mechanical longitudinal part, such as a revolution part.

Of course, the invention is in no way limited to the aforementioned embodiment, this embodiment having been given by way of example. Modifications remain possible, in particular from the point of view of the constitution of the various components or by the substitution of technical equivalents without however departing from the scope of the invention.

Thus, the pipe 1 may comprise a unique reinforcing layer 4.

Furthermore, the pipe 1 could comprise more than one layer 6 of refractory material.

The invention claimed is:

1. A protection sheath, intended to cover a fluid transporting pipe, the sheath comprising a flame-proof non-flammable layer and a heat insulation layer arranged beneath the non-flammable layer, the non-flammable layer comprising only carbon and the heat insulation layer comprising a knitted fabric, the knitted fabric comprising a plurality of stitches and air trapped within the plurality of stitches, the heat insulation layer comprising at least 70 vol. % of air, and wherein the non-flammable layer comprises carbon fibers providing a 100% fiber coverage rate without spaces between the carbon fibers in order to protect the heat insulation layer from contact with flames.

2. The sheath according to claim 1, wherein the sheath comprises, over the non-flammable layer, a sealing anti-fire-starter layer intended for preventing, prior to a fire, combustibles from the outside environment from penetrating through the sheath.

3. The sheath according to claim 2, wherein the sealing anti-fire-starter layer comprises a fluoropolymer.

4. The sheath according to claim 3, wherein the sealing anti-fire-starter layer is made of polytetrafluoroethylene (PTFE).

5. The sheath according to claim 1, wherein the knitted fabric corresponds to a glass fiber knitted fabric.

6. The sheath according to claim 1, wherein the non-flammable layer corresponds to a carbon fiber braid.

7. The sheath according to claim 1, wherein the heat insulation layer is constituted of two superimposed knitted fabric layers.

8. A method of producing a pipe comprising an upper layer, the method comprising a step of depositing, on the upper layer of the pipe, a protection sheath according to claim 1.

9. The method according to claim 8, wherein the step of depositing the sheath on the upper layer comprises a step of knitting the heat insulation layer onto the upper layer of the pipe in order to obtain a heat insulation layer of an external diameter such that the heat insulation layer comprises 70% vol. of air, and a step of depositing the non-flammable layer comprising carbon and of an internal diameter substantially equal to the external diameter of the heat insulation layer.

10. The method according to claim 8, wherein the step of depositing the non-flammable carbon layer corresponds to braiding carbon fibers.

11. A composite pipe intended for transporting a fluid in an aircraft, comprising
- an internal tubular layer forming a chemical barrier within which a fluid is intended to flow,
- at least one reinforcing layer covering the internal tubular layer and being intended to resist pressure inside the pipe,
- at least one fire resistance layer covering said at least one reinforcing layer, wherein said at least one fire resistance layer includes carbon and is intended for protecting the pipe from fire, and
- a protection sheath according to claim 1,
- wherein said at least one fire resistance layer corresponds to the non-flammable layer.

12. The pipe according to claim 11, wherein the internal tubular layer forming chemical barrier is made of polytetrafluoroethylene (PTFE).

13. An aircraft, in particular an airplane, comprising a pipe according to claim 11.

\* \* \* \* \*